United States Patent
Son (10) Patent No.: US 9,893,528 B2
(45) Date of Patent: Feb. 13, 2018

(54) MODULAR MULTI-LEVEL CONVERTER AND METHOD OF CONTROLLING VOLTAGE BALANCING OF MODULAR MULTI-LEVEL CONVERTER

(71) Applicant: LSIS CO., LTD., Anyang-si, Gyeonggi-do (KR)

(72) Inventor: Gum Tae Son, Seoul (KR)

(73) Assignee: LSIS CO., LTD, Anyang-Si, Gyeonggi-Do (KR)

(*) Notice: Subject to any disclaimer, the term of this patent is extended or adjusted under 35 U.S.C. 154(b) by 0 days.

(21) Appl. No.: 15/077,503

(22) Filed: Mar. 22, 2016

(65) Prior Publication Data
US 2017/0005472 A1 Jan. 5, 2017

(30) Foreign Application Priority Data

Jul. 2, 2015 (KR) .................. 10-2015-0094574

(51) Int. Cl.
*H02J 3/36* (2006.01)
*H02M 7/483* (2007.01)
*H02M 5/458* (2006.01)

(52) U.S. Cl.
CPC .............. *H02J 3/36* (2013.01); *H02M 5/458* (2013.01); *H02M 7/483* (2013.01); *H02M 2007/4835* (2013.01)

(58) Field of Classification Search
CPC . H02M 2007/4835; H02M 2001/0074; H02M 2001/0077; H02M 5/458; H02M 7/483; H02J 3/36
See application file for complete search history.

(56) References Cited

U.S. PATENT DOCUMENTS 5,986,909 A 1/1999 Hammond et al.
5,999,427 A 12/1999 Dahler et al.
(Continued)

FOREIGN PATENT DOCUMENTS

EP 2611022 7/2013
EP 2808991 12/2014
JP H1070886 3/1998
(Continued)

OTHER PUBLICATIONS

European Patent Office Application Serial No. 16165018.9, Search Report dated Jan. 2, 2017, 6 pages.
(Continued)

*Primary Examiner* — Henry Lee, III
(74) *Attorney, Agent, or Firm* — K&L Gates, LLP (57) ABSTRACT

A method of controlling voltage balancing of a modular multi-level converter is provided. The method includes receiving state information on each of n sub modules in an arm module, grouping the n sub modules into m sub module groups, receiving first state information on each of sub modules in a first one of the m sub module groups, among the state information on each of the n sum modules, receiving second state information on each of sub modules not included in the first sub module group, among state information on each of the n sum modules previously stored in a memory, controlling switching of a sub module by using the first state information and the second state information, and updating the memory with the first state information.

20 Claims, 8 Drawing Sheets

(56) References Cited

U.S. PATENT DOCUMENTS

2011/0222323 A1* 9/2011 Dofnas ................ H02M 7/483
                                                                               363/71
2014/0002048 A1 1/2014 Pang et al.

FOREIGN PATENT DOCUMENTS

| JP | H11136955 | 5/1999 |
| JP | 2000-060142 A | 2/2000 |
| JP | 2010517496 | 9/2010 |
| JP | 2013141394 | 7/2013 |
| JP | 2014233198 | 12/2014 |
| KR | 10-2008-0109242 | 12/2008 |
| KR | 10-2013-1221159 | 1/2013 |
| KR | 10-2014-1380079 | 4/2014 |

OTHER PUBLICATIONS

Japan Patent Office Application No. 2016-084258, Office Action dated May 9, 2017, 2 pages.

\* cited by examiner

FIG. 8A on_state SM group

FIG. 8B off_state SM group

MODULAR MULTI-LEVEL CONVERTER AND METHOD OF CONTROLLING VOLTAGE BALANCING OF MODULAR MULTI-LEVEL CONVERTER

CROSS-REFERENCE TO RELATED APPLICATIONS

Pursuant to 35 U.S.C. § 119(a), this application claims the benefit of earlier filing date and right of priority to Korean Patent Application No. 10-2015-0094574, filed on Jul. 2, 2015, the contents of which are all hereby incorporated by reference herein in its entirety.

BACKGROUND

The present disclosure relates to a modular multi-level converter, and more particularly, to a method of controlling voltage balancing.

Since high voltage direct current (HVDC) transmission has advantages as compared with high voltage alternating current transmission (HVAC) in that it is possible to perform long-distance transmission and an asynchronous grid connection, use a submarine cable, and perform power control, its applications are steadily increasing.

In an HVDC transmission system, at a transmission side converts and transmits AC power into DC power, and a reception side converts the DC power into the AC power to supply the AC power to a consumer.

Thus, the HVDC transmission system essentially includes a converter in order to convert the AC power into the DC power or convert the DC power into the AC power.

Figure 1:
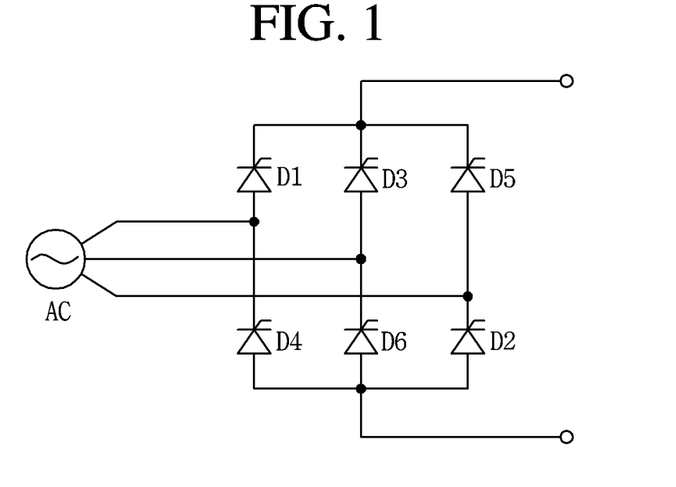
FIG. 1 shows a general converter that a high voltage direct current (HVDC) transmission system.

Such a converter includes six arms D1 to D6 as shown in FIG. 1. AC power is converted into DC power by the switching control of respective arms D1 to D6.

Each of arms D1 to D5 includes a switch. However, there is a limit in a voltage that a single switch may stand.

Thus, a modular multi-level converter has been recently proposed in which each of arms D1 to D6 includes a plurality sub modules and which may thus stand a high voltage by the selective switching control of each sub module.

Each sub module includes two insulating gate bipolar transistor (IGBT) and a capacitor.

The number of sub modules that each of arms D1 to D6 includes may be determined according to the processing capacity of the modular multi-level converter and may be up to several hundreds. However, it is not easy to perform selective switching control on the sub module.

In particular, the voltage value of the capacitor in the sub module is not fixed due to an operation condition but varies. In addition, in the case where a large number of sub modules are manufactured by different manufacturers, the specification of the capacitor of each sub module may be different from each other. Thus, the capacitance of the capacitor of each sub module may be different from each other and due to such a difference in the capacitance of the capacitor, the capacitance voltage of the capacitor of each sub module may vary. The capacitor value is a voltage charged in the capacitor.

Since the charging time of the voltage charged in the capacitance is different from each other when the capacity of the capacitance of each sub module is different from each other, the switching frequency of a sub module that has low capacitance sharply increases, and the switching frequency of a sub module that has high capacitance sharply decreases. If the switching frequency of each sub module sharply increases or decreases in this way, there is a drawback in that the life of the IGBT in the sub module shortens.

Since it makes the life of the sub module short, there is an urgent need for a technology that constantly maintains the capacitor voltage of the sub module.

SUMMARY

Embodiments are intended to overcome the above-described drawbacks and other drawbacks.

Embodiments provide a modular multi-level converter that may uniformly maintain the switching frequency of a sub module even when the capacitor voltage of the sub module varies, to extend the life of a sub module, and a method of controlling the voltage balancing of the modular multi-level converter.

In one embodiment, a method of controlling voltage balancing of a modular multi-level converter includes receiving, by an input unit, state information on each of n sub modules in an arm module; grouping, by the input unit, the n sub modules into m sub module groups; receiving, by a determination unit, first state information on each of sub modules in a first one of the m sub module groups, among the received state information on each of the n sum modules; receiving, by the determination unit, second state information on each of sub modules not included in the first sub module group, among state information on each of the n sum modules previously stored in a memory; controlling, by the determination unit, switching of a sub module by using the first state information and the second state information; and updating, by the determination unit, the memory with the first state information.

In another embodiment, a modular multi-level converter includes a memory configured to store state information on each of n sub modules in an arm module; an input unit configured to receive the state information on each of the n sub modules from the arm module to group the n sub modules into m sub module groups; and a determination unit configured to receive first state information on each of sub modules in a first one of the m sub module groups, to receive second state information on each of sub modules not included in the first sub module group, among state information on each of the n sum modules previously stored in the memory, and to determine switching control of a sub module by using the first state information and the second state information.

The effects of a terminal according to the present disclosure are as follows.

According to at least one of embodiments, since weight information is applied to the sub module voltage of each sub module to uniformly maintain the switching frequencies between a plurality of sub modules in an arm module, there is an advantage in that it is possible to enhance the reliability of a goods through the extension of the life of each sub module itself and of the life of the switch of each sub module.

The additional scope of the applicability of the present disclosure would be clarified from the following detailed description. However, since various changes and modifications within the spirit and scope of the present disclosure may be clearly understood by a person skilled in the art, particular embodiments, such as exemplary embodiments should be only understood as examples.

DETAILED DESCRIPTION OF THE EMBODIMENTS

Hereinafter, embodiments are described in detail with reference to the accompanying drawings and regardless of the numbers of the drawings, the same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. In describing the embodiments disclosed in the present disclosure, detailed descriptions of related known technologies will be omitted because they would obscure the subject of the embodiments disclosed in the present disclosure. Also, the accompanying drawings are used to help easily understanding embodiments disclosed herein but the technical idea disclosed in the present disclosure is not limited thereto. It should be understood that all of variations, equivalents or substitutes contained in the concept and technical scope of the present disclosure are also included.

Figure 2:
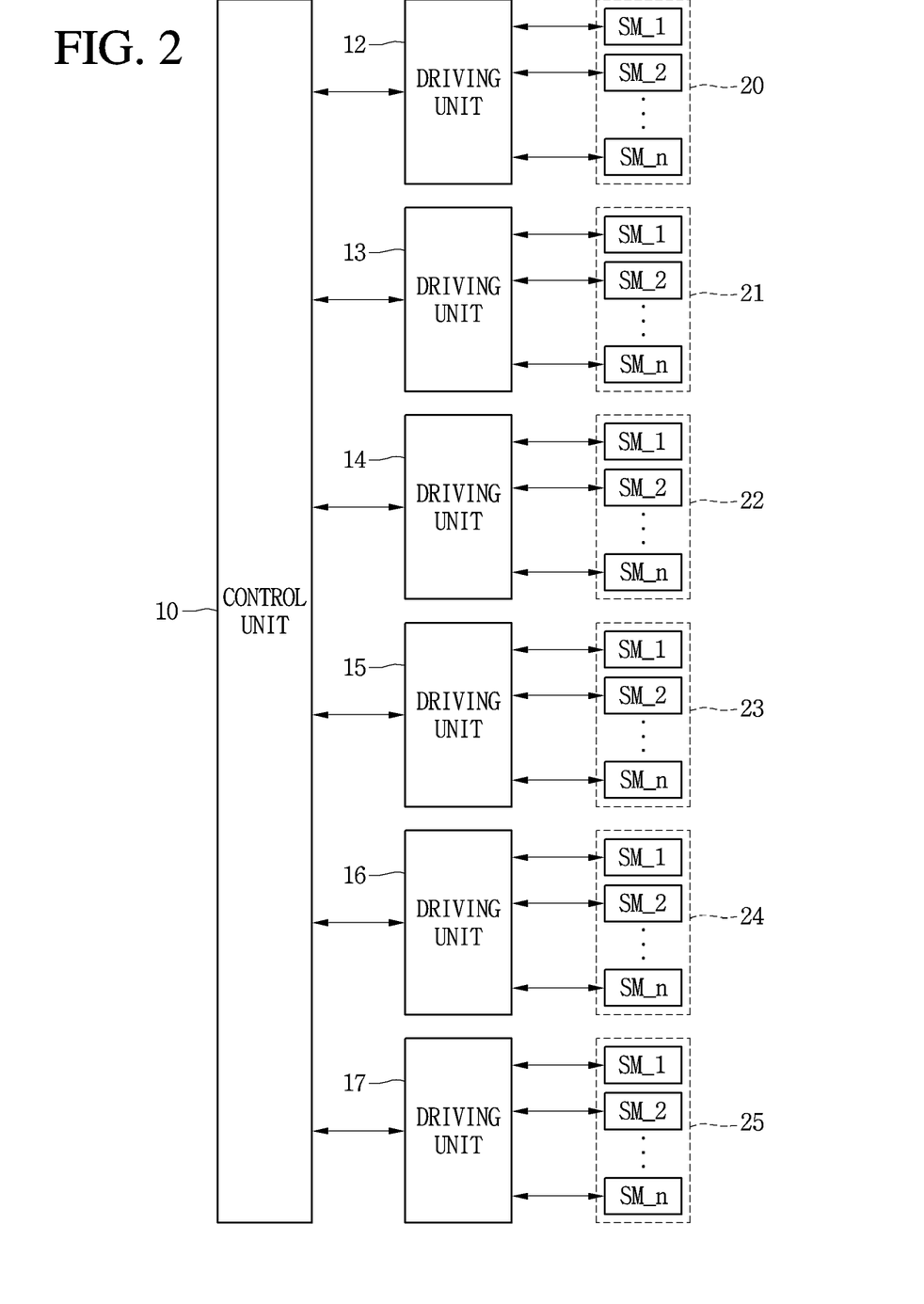
FIG. 2 shows a modular multi-level converter according to an embodiment.

FIG. 2 shows a modular multi-level converter according to an embodiment.

Referring to FIG. 2, the modular multi-level converter according to an embodiment may include a control unit 10, a plurality of driving units 12 to 17, and a plurality of arm modules 20 to 25. As described below, each of arm modules 20 to 25 may include a plurality of sub modules SM_1 to SM_n.

The plurality of driving units 12 to 17 may be connected to the plurality of arm modules 20 to 25 by one to one.

For example, a first driving unit 12 may be connected to a first arm module 20 so that information on the first arm module 20 may be provided to the first driving unit 12 and a plurality of gate signals that are generated based on the information on the first arm module 20 by the first driving unit 12 may be provided to the first arm module 20. Each of remaining arm modules 21 to 25 may also receive a plurality of gate signals from a corresponding driving unit 13 to 17 in this way.

Figure 4:
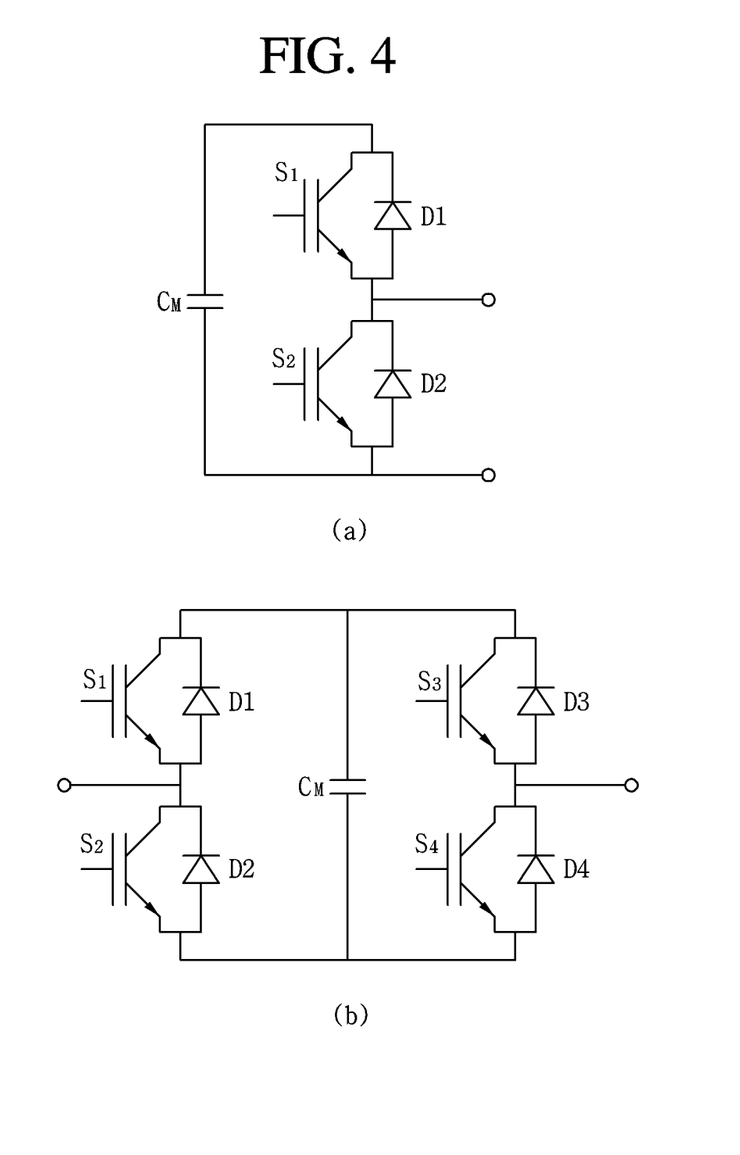
FIG. 4 shows a circuit diagram of a sub module in an arm.

Each of the sub modules SM_1 to SM_n may include a switch and a capacitor. The connection structure between the switch and the capacitor is described below with reference to FIG. 4. Each of the sub modules SM_1 to SM_n may further include a thyristor.

In the case where an over-current flows suddenly into each of the sub modules SM_1 to SM_n, the thyristor may bypass the over-current flowing into each of the sub modules SM1_SM_n to prevent damage to the switch or the capacitor. The switch may include e.g., an insulated gate bipolar mode transistor (IGBT) but is not limited thereto.

Remaining driving units, such as second to sixth driving units 13 to 17 may perform the same operation as the first driving unit 12.

Figure 5:
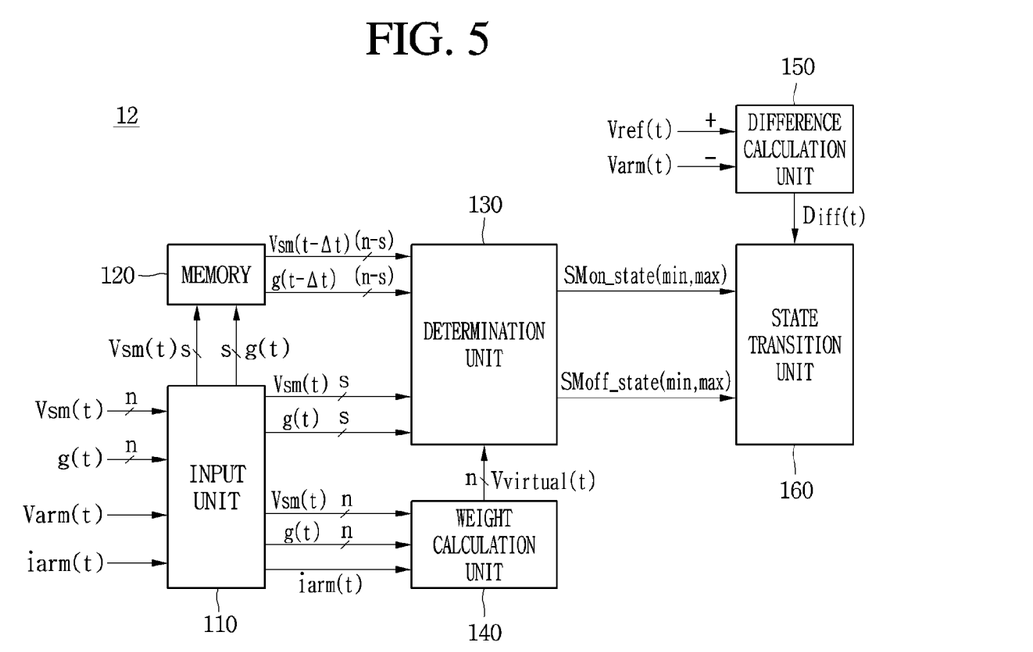
FIG. 5 shows a driving unit in FIG. 2

The information on each of the arm modules 20 to 25 may include state information on each of the sub modules SM_1 to SM_n, an arm current iarm (t) and an arm voltage Varm (t), as shown in FIG. 5. The state information on each of the sub modules SM_1 to SM_n may include on/off state information g (t), a sub module voltage Vsm (t), bypass information, or the like.

The sub module voltage Vsm (t) may mean a voltage charged in the capacitor in each of the sub modules SM_1 to SM_n.

The control unit 10 controls the plurality of driving units 12 to 17 and provides a reference voltage (See Vref (t) in FIG. 5) to the plurality of driving units 12 to 17.

The plurality of driving units 12 to 17 may determine the number of the plurality of sub modules SM_1 to SM_n that are connected to the arm modules 20 to 25 and have an on state, based on the reference voltage Vref (t) that is provided from the control unit 10. The fact that each of the sub modules SM_1 to SM_n has an on state means turning on the switch of each of the sub modules SM_1 to SM_n. As described below, each of the sub modules SM_1 to SM_n may include at least one switch, e.g., IGBT.

Figure 3:
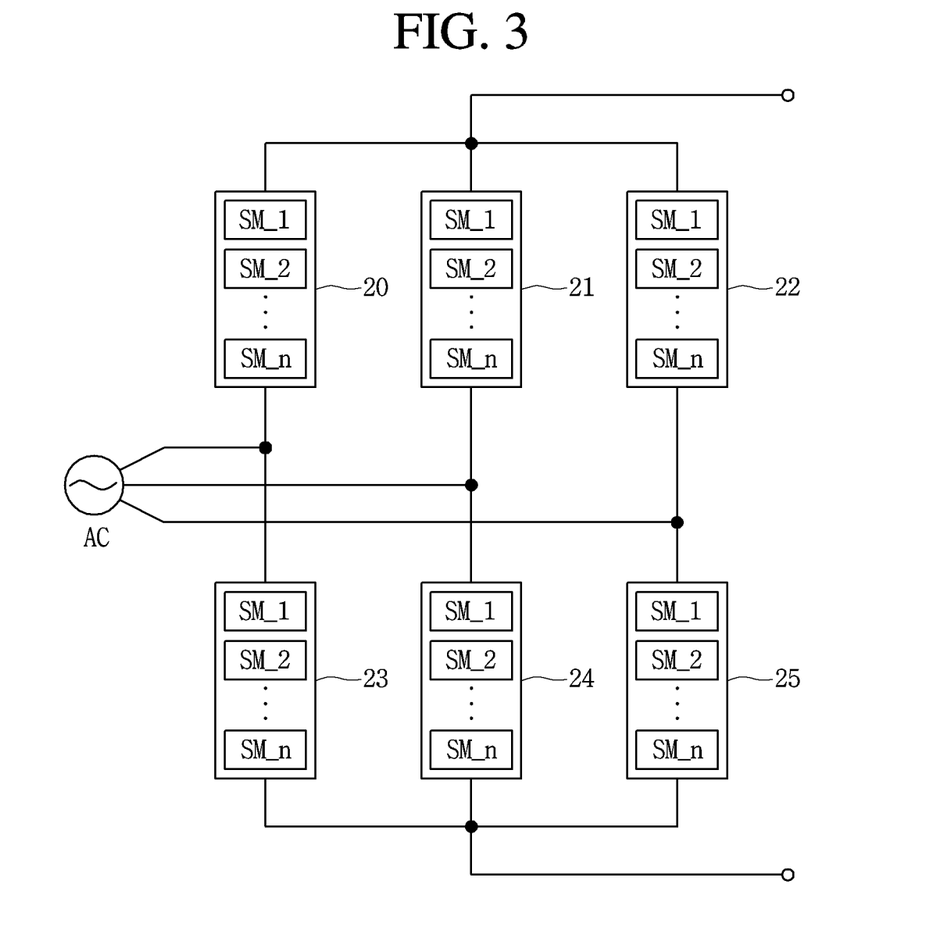
FIG. 3 shows the connection of a three-phase arm bridge in a modular multi-level converter according to an embodiment.

As shown in FIG. 3, a three-phase arm bridge connection may include e.g., six arm modules 20 to 25. Each of the arm modules 20 to 25 may include a plurality of sub modules SM_1 to SM_n. The number of sub modules SM_1 to SM_n in each of the arm modules 20 to 25 may be the same or different.

Each of the arm modules 20 to 25 may control the switching on/off of each of the sub modules SM_1 to SM_n, receive and transmit information through communication with each of the driving units 12 to 17. That is, each of the arm modules 20 to 25 may provide information on each of the arm modules 20 to 25 to a corresponding driving unit 12 to 17, and receive a plurality of gate signals for the switching of each of the sub modules SM_1 to SM_n from each of the driving units 12 to 17.

Although each of the arm modules 20 to 25 in the present disclosure includes n sub modules SM_1 to SM_n, each of the arm modules 20 to 25 may also include sub modules that are more or less than n sub modules SM_1 to SM_n.

The plurality of sub modules SM_1 to SM_n in each of the arm modules 20 to 25 may be connected in series each other.

Each of the arm modules 20 to 25 may provide state information on each of the sub modules SM_1 to SM_n, an arm current iarm (t), and an arm voltage Varm (t) to a corresponding driving unit 12 to 17.

Although not shown, the plurality of sub modules SM_1 to SM_n in each of the arm modules 20 to 25 may be grouped with a certain number of sub modules to be mounted by group on a board.

Although not shown, each of the arm modules 20 to 25 may also include a main board having a communication function or a control function in addition to the board on which the grouped sub modules SM_1 to SM_n are mounted, but the embodiment is not limited thereto. Such a main board may aggregate state information on each of the sub modules SM_1 to SM_n, identify the arm current iarm (t) and the arm voltage Varm (t), and provide the state information on each of the sub modules SM_1 to SM_n, the arm current iarm (t) and the arm voltage Varm (t) to the driving units 12 to 17. Also, the main board may receive the plurality of gate signals provided from the driving units 12 to 17, provide the plurality of gate signals to a corresponding sub module SM_1 to SM_n, and enable each of the sub modules SM_1 to SM_n to be turned on or off in response to the plurality of gate signals.

The arm modules 20 to 25 may be connected to the driving units 12 to 17, respectively by optical cables to transmit and receive information by using optical communication.

Each of the sub modules SM_1 to SM_n may be a half-type sub module (in FIG. 4a) or a full-type sub module (in FIG. 4b).

As shown in FIG. 4a, the half-type sub module may include two switches S1 and S2, two diodes D1 and D2, and a capacitor $C_M$.

The diodes D1 and D2 may be connected in parallel to the switches S1 and S2, respectively to prevent a current from flowing backward to prevent the malfunction of the switches S1 and S2.

The capacitor $C_M$ plays roles in charging a voltage that is input when the first and second switches S1 and S2 are turned on, and discharging the charged voltage when the first and second switches S1 and S2 are turned off.

The first and second switches S1 and S2 may be turned on or off by the gate signals that are provided from the driving units 12 and 17. When the first and second switches S1 and S2 are turned on, an AC voltage may be charged in the capacitor $C_M$.

Each of the first and second switches S1 and S2 may be an IGBT but is not limited thereto.

As shown in FIG. 4b, the full-type sub module may include four switches S1 to S4, four diodes D1 to D4, and a capacitor $C_M$.

The diodes D1 to D4 may be connected in parallel to the switches S1 to S4, respectively.

For example, when the first and second switches S1 and S4 are turned on, a positive AC voltage may be charged in the capacitor $C_M$, and when the second and third switches S2 and S3 are turned on, a negative AC voltage may be charged in the capacitor $C_M$, but the embodiment is not limited thereto.

The modular multi-level converter of the present disclosure may also include two or more three-phase arm bridge connections but is not limited thereto.

The operating method of the driving units 12 to 17 of the modular multi-level converter as described above is described.

Although FIG. 5 represents the driving unit 12 for the convenience of description, remaining driving units 13 to 17 may also be configured as the same components as FIG. 5 to perform the same function.

Referring to FIG. 5, the driving unit 12 may include an input unit 110, a memory 120, a weight calculation unit 140, and a determination unit 130.

In addition, the driving unit 12 may further include a difference calculation unit 150 and a state transition unit 160.

The input unit 110 receives related information, such as state information on each of the sub modules SM_1 to SM_n, an arm current iarm (t), and an arm voltage Varm (t) that are provided from the arm module 20. The state information on each of the sub modules SM_1 to SM_n may include on/off state information g (t), a sub module voltage Vsm (t), bypass information, or the like.

While one arm current iarm (t) and one arm voltage Varm (t) may be generated by the arm module 20, each of the on/off state information g(t) and the sub module voltage Vsm (t) may be generated by the number of the sub modules SM_1 to SM_1 in the arm module 20. For example, if the arm module 20 includes n sub modules SM_1 to SM_n, each of the on/off state information g (t) and the sub module voltage Vsm (t) may be generated by n sub modules SM_1 to SM_n.

Figure 6:
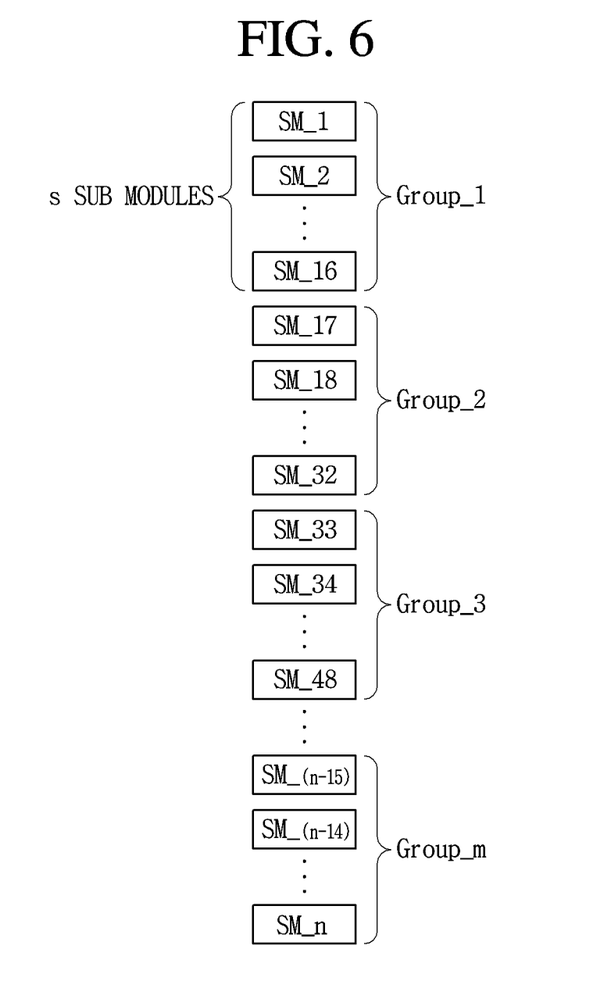
FIG. 6 shows the grouping of a plurality of sub modules.

The input unit 110 groups n sub modules SM_1 to SM_n into m sub module groups Group_1 to Group_m to transmit, to the determination unit 130, on/off state information g (t) on s sub modules SM_1 to SM_s in one of the m sub module groups Group_1 to Group_m and the sub module voltage Vsm (t).

As another embodiment, the on/off state information g (t) and sub module voltage Vsm (t) of each of the n sub modules SM_1 to SM_n may be, in each cycle, updated and stored in the input unit 110, and the determination unit 130 may read the on/off state information g (t) and sub module voltage Vsm(t) of each of s sub modules SM_1 to SM_s among the updated on/off state information g (t) and sub module voltage Vsm (t) of each of the n sub modules SM_1 to SM_n. For example, each of sub module group Group_1 to Group_m may include 16 sub modules but is not limited thereto.

If n is 256 and each of the sub module groups Group_1 to Group_m includes 16 sub modules SM_1 to Sm_16, 256 sub modules SM_1 to SM_256 may be grouped into 16 sub module groups Group_1 to Group_16.

For example, first to sixteenth sub modules SM_1 to SM_16 may be grouped as the first sub module group Group_1, and seventeenth to thirty second sub modules SM_17 to SM_32 may be grouped as the second sub module group Group_2. In this way, 241st to 256th sub modules SM_241 to SM_256 may be grouped as sixteenth sub module group Group_16.

The input unit 110 may transmit, to the determination unit 130, the regularly-input on-off state information g (t) and sub module voltage Vsm (t) of each of s sub modules SM_1 to SM_s in one of m sub module groups Group_1 to Group_m that are grouped with n sub modules SM_1 to SM_n.

As another embodiment, the determination unit 130 may read, directly from the input unit 110, the on/off state information g (t) and sub module voltage Vsm (t) of each of s sub modules SM_1 to SM_s among the on/off state information g (t) and sub module voltage Vsm (t) of each of n sub modules SM_1 to SM_n, as described earlier.

Figure 7:
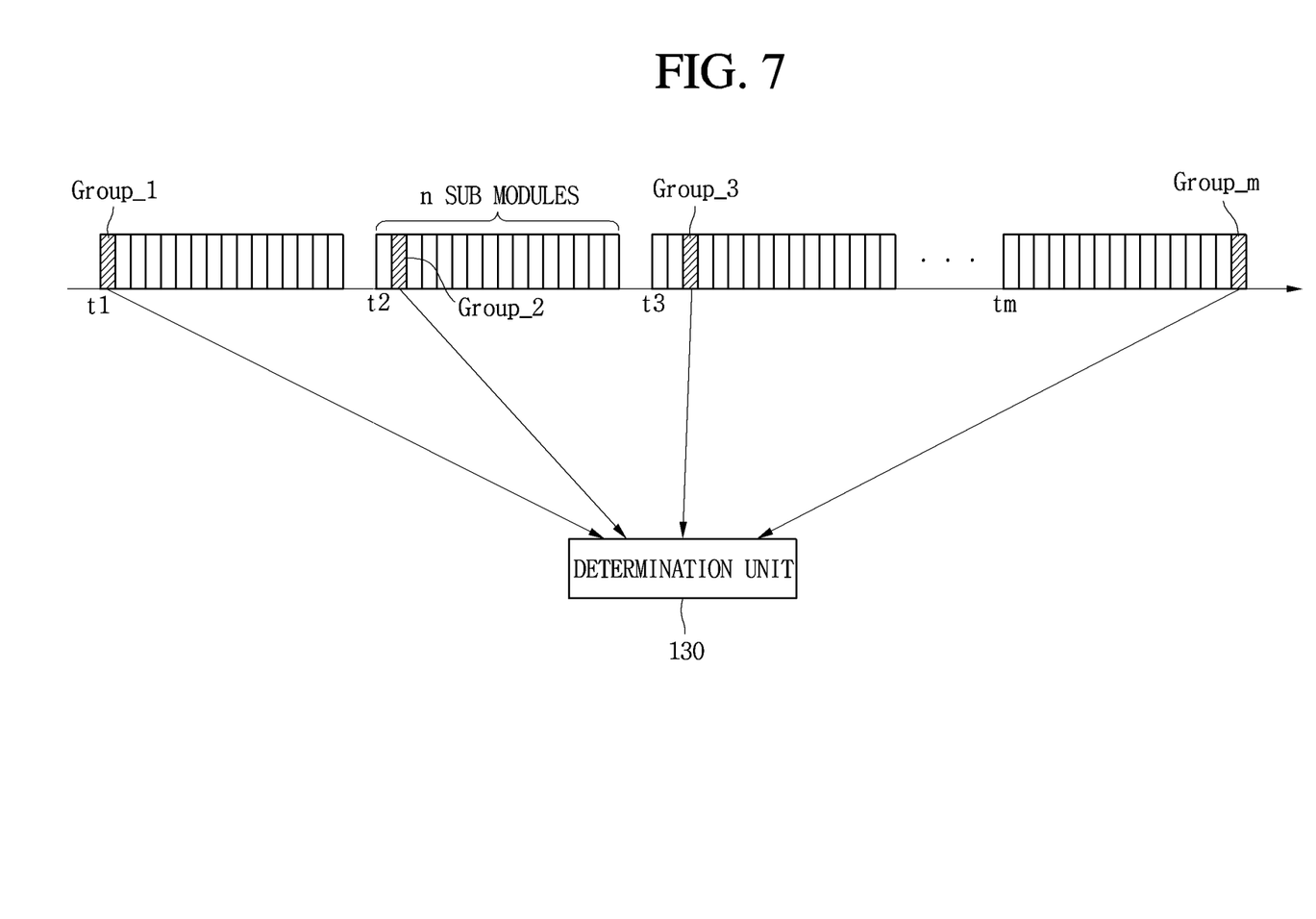
FIG. 7 shows how information is transmitted by sub module group from an input unit to a determination unit.

As shown in FIG. 7, the on/off state information g (t) and sub module voltage Vsm (t) of each of n sub modules SM_1 to SM_n are transmitted from the arm module 20 to the input unit 110 at time t1, for example. The input unit 110 groups n sub modules SM_1 to SM_n into m sub module groups Group_1 to Group_m and then transmits, to the determination unit 130, the on/off state information g (t) and sub module voltage Vsm (t) of each of first to sixteenth sub modules SM_1 to SM_16 that are grouped as the first sub module group Group_1.

The on/off state information g (t) and sub module voltage Vsm (t) of each of the first to sixteenth sub modules SM_1 to SM_16 that are grouped as the first sub module group Group_1 are transmitted to the memory 120 so that the memory 120 is updated with the transmitted on/off state information g (t) and sub module voltage Vsm (t). That is, the on/off state information g (t-Δt) and sub module voltage Vsm (t-Δt) of each of the first to sixteenth sub modules SM_1 to SM_16 in the first sub module group Group_1 that have been previously stored in the memory 120 may be updated with the on/off state information g (t) and sub module voltage Vsm (t) of each of the first to sixteenth sub modules SM_1 to SM_16 in the first sub module group Group_1 that are currently transmitted to the memory 120.

Subsequently, another n sub modules SM_1 to SM_n are transmitted from the arm module 20 to the input unit 110 at time t2. The input unit 110 groups another n sub modules SM_1 to SM_n into m sub module groups Group_1 to Group_m and then transmits, to the determination unit 130, the on/off state information g (t) and sub module voltage Vsm (t) of each of seventeenth to thirty second sub modules SM_17 to SM_32 that is grouped as the second sub module group Group_1. In addition, the on/off state information g (t) and sub module voltage Vsm (t) of each of the seventeenth to thirty second sub modules SM_17 to SM_32 that are grouped as the second sub module group Group_2 are transmitted to the memory 120 so that the memory 120 is updated with the transmitted on/off state information g (t) and sub module voltage Vsm (t). That is, the on/off state information g (t-Δt) and sub module voltage Vsm (t-Δt) of each of the seventeenth to thirty second sub modules SM_17 to SM_32 in the second sub module group Group_2 that have been previously stored in the memory 120 may be updated with the on/off state information g (t) and sub module voltage Vsm (t) of each of the seventeenth to thirty second sub modules SM_17 to SM_32 in the second sub module group Group_2 that are currently transmitted to the memory 120.

In this way, n sub modules SM_1 to SM_n are transmitted from the arm module 20 to the input unit 110 at time tm, for example. The input unit 110 groups n sub modules SM_1 to SM_n into m sub module groups Group_1 to Group_m and then transmits, to the determination unit 130, the on/off state information g (t) and sub module voltage Vsm (t) of each of 241st to 256th sub modules SM_241 to SM_256 that are grouped as the mth sub module group Group_m. The on/off state information g (t) and sub module voltage Vsm (t) of each of the 241st to 256th sub modules SM_241 to SM_256 that are grouped as the mth sub module group Group_m are transmitted to the memory 120 so that the memory 120 is updated with the transmitted on/off state information g (t) and sub module voltage Vsm (t). That is, the on/off state information g (t-Δt) and sub module voltage Vsm (t-Δt) of each of the 241st to 256th sub modules SM_241 to SM_256 in the mth sub module group Group_m that have been previously stored in the memory 120 may be updated with the on/off state information g (t) and sub module voltage Vsm (t) of each of the 241st to 256th sub modules SM_241 to SM_256 in the mth sub module group Group_m that are currently transmitted to the memory 120.

As such, the on-off state information g (t) and sub module voltage Vsm (t) of each of s sub modules SM_1 to SM_s in one of m sub module groups Group_1 to Group_m grouped with n sub modules SM_1 to SM_n that are input m times for m cycles may be input to the determination unit 130 and the memory 120 once.

Thus, each of m sub module groups Group_1 to Group_m may be transmitted at least once to the determination unit 130 or memory 120 for m cycles. In the memory 120, the on/off state information g (t) and sub module voltage Vsm (t) of each of s sub modules SM_1 to SM_s in a sub module group transmitted at least once for m cycles may be replaced with the previously transmitted on/off state information g(t-Δt) and sub module voltage Vsm (t-Δt) of each of s sub modules SM_1 to SM_s in a sub module group previously stored in the memory 120 and updated.

The input unit 110 may transmit, to the weight calculation unit 140, the on/off state information g (t) and sub module voltage Vsm (t) of n sub modules SM_1 to SM_n that are transmitted from the arm module 20.

The weight calculation unit 140 may calculate or generate weight information Vvirtual (t) on each of n sub modules SM_1 to SM_n based on the on/off state information g (t) and sub module voltage Vsm(t) of each of n sub modules SM_1 to SM_n and an arm current iarm (t) transmitted from the input unit 110 to transmit the calculated weight information Vvirtual (t) to the determination unit 130.

The weight calculation unit 140 and the determination unit 130 may be configured as different computation modules. For example, the weight calculation unit 140 may include a field-programmable gate array (FPGA), and the determination unit 130 may include a digital signal processor (DSP).

The FPGA may perform parallel computation. Thus, since the on/off state information g (t) and sub module voltage Vsm (t) of n sub modules SM_1 to SM_n transmitted to the weight calculation unit 140 may be computed in parallel, the processing speed may be enhanced and thus the weight calculation unit 140 does not have a significant load.

The weight information Vvirtual (t) may be represented by a voltage value, e.g., a positive voltage value, a negative voltage value, or 0. In the case where the weight information Vvirtual (t) is the positive voltage value, it may be added to a corresponding sub module voltage Vsm (t) that is transmitted from the input unit 110 to the determination unit 130. In the case where the weight information Vvirtual (t) is the negative voltage value, it may be subtracted from a corresponding sub module voltage Vsm (t) that is transmitted from the input unit 110 to the determination unit 130. In the case where the weight information Vvirtual (t) is 0, a corresponding sub module voltage Vsm (t) that is transmitted from the input unit 110 to the determination unit 130 may be maintained as it is.

Various algorithms may be used in order to calculate the virtual information Vvirtual (t) by the weight calculation unit 140 but these algorithms are widely known techniques.

For example, a recursive least square (RLS) algorithm may be used. Such an algorithm may calculate an amount of energy at a changed (estimated) capacitor based on an energy fluctuation relationship (a relationship between a rated capacity, power factor, and voltage ripple) by a rated capacitance value to calculate a shortage or surplus. The weight information Vvirtual (t) may be calculated in order to be the same as the capacitance that varies through the relationship between the energy fluctuation and the capacitance.

Since the weight information Vvirtual (t) is added to/subtracted from a corresponding sub module voltage Vsm (t) transmitted from the input unit 110 to the determination unit 130, or is maintained, the switching frequencies between the plurality of sub modules SM_1 to SM_n in the arm module 20 may be uniformly maintained.

The determination unit 130 receives the on/off state information g (t) and sub module voltage Vsm (t) of each of s sub modules SM_1 to SM_s in a sub module group transmitted from the input unit 110 and the on/off state information g (t-Δt) and sub module voltage Vsm (t-Δt) of n-s sub modules in each of remaining sub module groups excluding s sub modules SM_1 to SM_s input from the input unit 110 among n sub modules SM_1 to SM_n stored in the memory 120.

The determination unit 130 applies the weight information Vvirtual (t) transmitted from the weight calculation unit 140 to the sub module voltage Vsm (t) of each of s sub modules SM_1 to SM_s in a sub module group input from the input unit 110.

In addition, the determination unit 130 applies the weight information Vvirtual (t) transmitted from the weight calculation unit 140 to the sub module voltages Vsm (t-Δt) of n-s sub modules in remaining sub module groups excluding s sub modules SM_1 to SM_s in a sub module group received from the memory 120 and input from the input unit 110.

The weight information Vvirtual (t) calculated from the weight calculation unit 140 may be generated to correspond to each of n sub modules SM_1 to SM_n.

For example, in the case where the weight information Vvirtual (t) is the positive voltage value, it may be added to the sub module voltages Vsm (t) and Vsm (t-Δt) of each of sub modules SM_1 to SM_n, in the case where the weight information Vvirtual (t) is the negative voltage value, it may be subtracted from the sub module voltages Vsm (t) and Vsm (t-Δt) of each of sub modules SM_1 to SM_n, and in the case where the weight information Vvirtual (t) is 0, the sub module voltages Vsm (t) and Vsm (t-Δt) of each of sub modules SM_1 to SM_n may be maintained as it is.

The determination unit 130 groups sub modules SM_1 to SM_n into an on-state sub module (SM) group and an off-state sub module (SM) group based on on/off state information g (t) on each of s sub modules SM_1 to SM_s in a sub module group input from the input unit 110 and on-off state information g (t-Δt) on each of remaining (n-s) sub modules excluding the s sub modules SM_1 to SM_s received from the memory 120.

Figure 8A:
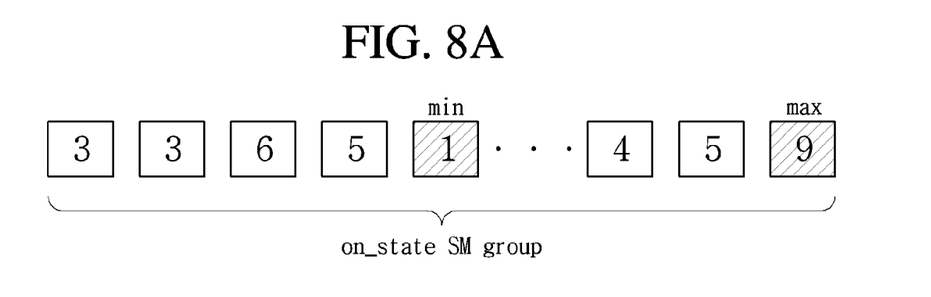
FIGS. 8a and 8b show how to determine sub modules that have minimum/maximum capacitor voltages by each state group.

As shown in FIG. 8a, it is possible to identify the on/off state of each of sub modules SM_1 to SM_n through on/off state information g (t) and g (t-Δt) on each of sub modules SM_1 to SM_n. The fact that each of the sub modules SM_1 to SM_n has an on state may mean that a switch in each of the sub modules SM_1 to SM_n is turned on, and the fact that each of the sub modules SM_1 to SM_n is in an off state may mean that a switch in each of the sub modules SM_1 to SM_n is turned off.

Thus, each of the sub modules SM_1 to SM_n that have an on state may be grouped as the on-state SM group based on on/off state information g (t) and g (t-Δt) of each of the sub module groups SM_1 to SM_n.

Figure 8B:
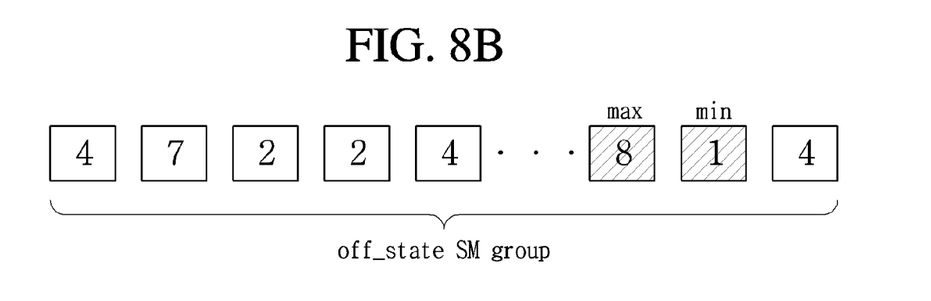

Likewise, each of the sub modules SM_1 to SM_n that are in an off state may be grouped as the off-state SM group based on on/off state information g (t) and g (t-Δt) of each of the sub module groups SM_1 to SM_n, as shown in FIG. 8b.

Unlike the above description, the sub modules SM_1 to SM_n may be first grouped into the on-state SM group and the off-state SM group and then it is possible to apply the weight information Vvirtual (t) transmitted from the weight calculation unit 140 to the sub module voltages Vsm (t) and Vsm (t-Δt) of each of the sub modules in a corresponding sub module group, but the embodiment is not limited thereto.

The determination unit 130 determines a sub module SMon-state(min) having a minimum sub module voltage and a sub module SMon-state(max) having a maximum sub module voltage among the sub module voltages Vsm (t) and Vsm (t-Δt) of the plurality of sub modules in the on-state SM group.

If as shown in FIG. 8a, the sub module voltages Vsm (t) and Vsm (t-Δt) of the plurality of sub modules in the on-state SM group are 3 V, 3 V, 6 V, 5 V, 1 V, . . . , 4 V, 5 V, 9 V, respectively, 1 V becomes the minimum voltage and 9 V becomes the maximum voltage, and thus the sub module having 1 V may be determined as a sub module SMon-state (min) having the minimum sub module voltage in the on-state SM group and the sub module having 9 V may be determined as a sub module SMon-state(max) having the maximum sub module voltage in the on-state SM group.

Likewise, the determination unit 130 determines a sub module SMoff-state (min) having the minimum sub module voltage and a sub module SMon-state (max) having the maximum sub module voltage among the sub module voltages of the plurality of sub modules in the off-state SM group.

If as shown in FIG. 8b, the sub module voltages Vsm (t) and Vsm (t-Δt) of the plurality of sub modules in the off-state SM group are 4 V, 7 V, 2 V, 2 V, 4 V, . . . , 8 V, 1 V, 4 V, respectively, 1 V becomes the minimum voltage and 8V becomes the maximum voltage, and thus the sub module having 1 V may be determined as a sub module SMoff-state (min) having the minimum sub module voltage in the off-state SM group and the sub module having 8V may be determined as a sub module SMoff-state (max) having the maximum sub module voltage in the off-state SM group.

The determined sub module SMon-state(min) having the minimum sub module voltage and the sub module SMon-state(max) having the maximum sub module voltage in the on-state SM group and the sub module SMoff-state(min) having the minimum sub module voltage and the sub module SMoff-state(max) having the maximum sub module voltage in the off-state SM group are transmitted to the state transition unit 160.

The difference calculation unit 150 compares the reference voltage Vref (t) transmitted from the control unit 10 with the arm voltage Varm (t) transmitted from the arm module 20 to calculate a difference value Diff (t).

The arm voltage Varm (t) may be transmitted e.g., from the arm module 20 to the difference calculation unit 15 via the input unit 110 but is not limited thereto.

For example, it is possible to subtract the arm voltage Varm (t) from the reference voltage Vref (t) to calculate the difference value Diff (t).

For example, if the reference voltage Vref (t) is larger than the arm voltage Varm (t), a positive (+) difference value Diff (t) may be calculated. The positive (+) difference value Diff (t) may mean that a specific sub module that is currently in an off state is activated to have an on state. For example, in the case where the switch of a specific sub module is currently turned off, the switch of the specific sub module may be turned on if the difference value Diff (t) is positive (+).

For example, if the reference voltage Vref (t) is smaller than the arm voltage Varm (t), a negative (−) difference value Diff (t) may be calculated. The negative (−) difference value Diff (t) may mean that a specific sub module that has currently an on state is inactivated to be in an off state. For example, in the case where the switch of a specific sub module is currently turned on, the switch of the specific sub module may be turned off if the difference value Diff (t) is negative (−).

On the other hand, in the case where the positive (+) difference value Diff (t) is calculated, a specific module that has currently an on state may be inactivated to be in an off state, and in the case where the negative (−) difference value Diff (t) is calculated, a specific module that is currently in an off state may be activated to have an on state.

The state transition unit 160 receives the arm current iarm (t) that is transmitted from the arm module 20, and the difference value Diff (t) that is transmitted from the difference calculation unit 150. The arm current iarm (t) may be transmitted e.g., from the arm module 20 to the state transition unit 160 via the input unit 110 but is not limited thereto.

In addition, the state transition unit 160 receives the sub module SMon-state (min) having the minimum sub module voltage and the sub module SMon-state (max) having the maximum sub module voltage in the on-state SM group and the sub module SMoff-state (min) having the minimum sub module voltage and the sub module SMoff-state (max) having the maximum sub module voltage in the off-state SM group that are transmitted from the determination unit 130.

The state transition unit 160 may change, based on the difference value Diff (t) and the arm current iarm (t), the state of at least one of the sub module SMon-state (min) having the minimum sub module voltage and the sub module SMon-state (max) having the maximum sub module voltage in the on-state SM group and the sub module SMoff-state (min) having the minimum sub module voltage and the sub module SMoff-state (max) having the maximum sub module voltage in the off-state SM group that are transmitted from the determination unit 130.

FIGS. 9a to 9f show how to change the states of sub modules that have minimum/maximum capacitor voltages found by each state group.

In FIGS. 9a to 9f, the fact that the arm current iarm (t) is larger than 0 may mean that it is a forward current, and the fact that the arm current iarm (t) is smaller than 0 may mean that it is a backward current. In other words, the fact that the arm current iarm (t) is larger than 0 may mean that it is charged in a sub module, and the fact that the arm current iarm (t) is smaller than 0 may mean that the sub module is discharged.

Figure 9:
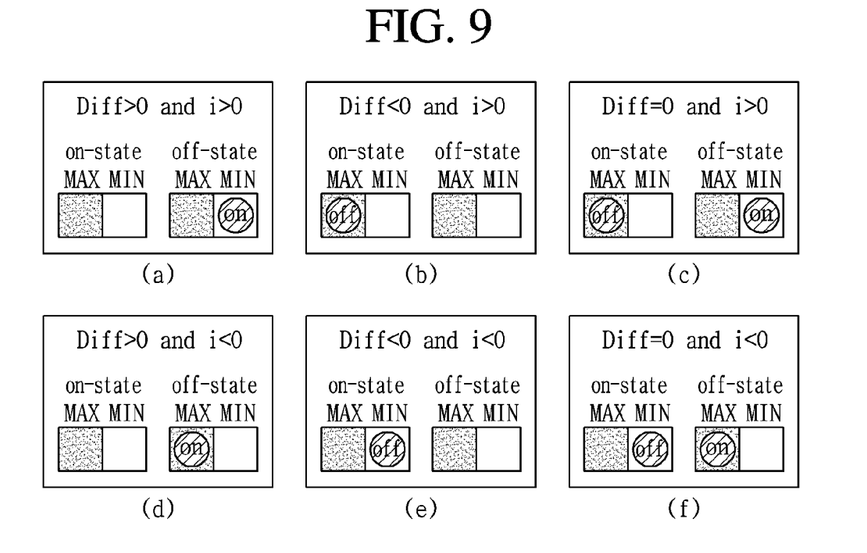
FIGS. 9a to 9f show how to change the states of sub modules that have minimum/maximum capacitor voltages found by each state group.

FIGS. 9a to 9c show a state in which a sub module is charged as a forward current, and FIGS. 9d to 9f show a state in which the sub module is discharged as a backward current.

As shown in FIG. 9a, in the case where both the difference value Diff (t) and the arm current iarm (t) are larger than 0, the state transition unit 160 may change, from the off state to the on state, the sub module SMoff-state (min) having the minimum sub module voltage in the off-state SM group among the sub module SMon-state (min) having the minimum sub module voltage and the sub module SMon-state (max) having the maximum sub module voltage in the on-state SM group and the sub module SMoff-state (min) having the minimum sub module voltage and the sub module having the maximum sub module voltage SMoff-state (max) in the off-state SM group. Thus, although a switch in the sub module SMoff-state (min) having the minimum sub module voltage in the off-state SM group is, in principle, turned off, a corresponding switch may be turned on because a corresponding sub module has been changed to the on state.

As shown in FIG. 9b, in the case where the difference value Diff (t) is smaller than 0 and the arm current iarm (t) is larger than 0, the state transition unit 160 may change, from the on state to the off state, the sub module SMon-state (max) having the maximum sub module voltage in the on-state SM group among the sub module SMon-state (min) having the minimum sub module voltage and the sub module SMon-state (max) having the maximum sub module voltage in the on-state SM group and the sub module SMoff-state (min) having the minimum sub module voltage and the sub module SMoff-state (max) having the maximum sub module voltage in the off-state SM group. Thus, although a switch in the sub module SMon-state (max) having the maximum sub module voltage in the on-state SM group is, in principle, turned on, a corresponding switch may be turned off because a corresponding sub module has been changed to the off state.

As shown in FIG. 9c, in the case where the difference value Diff (t) is 0 and the arm current iarm (t) is larger than 0, the state transition unit 160 may change, from the on stated to the off state, the sub module SMon-state (max) having the maximum sub module voltage in the on-state SM group and change, from the off state to the on state, the sub module SMoff-state (min) having the minimum sub module voltage in the off-state SM group.

As shown in FIG. 9d, in the case where the difference value Diff (t) is larger than 0 and the arm current iarm (t) is smaller than 0, the state transition unit 160 may change, from the off state to the on state, the sub module having the maximum sub module voltage SMoff-state (max) in the off-state SM group among the sub module having the minimum sub module voltage SMon-state (min) and the sub module SMon-state (max) having the maximum sub module voltage in the on-state SM group and the sub module SMoff-state (min) having the minimum sub module voltage and the sub module having the maximum sub module voltage SMoff-state (max) in the off-state SM group. Thus, although a switch in the sub module having the maximum sub module voltage SMoff-state (max) in the off-state SM group is, in principle, turned off, a corresponding switch may be turned on because a corresponding sub module has been changed to the on state.

As shown in FIG. 9e, in the case where both the difference value Diff (t) and the arm current iarm (t) is smaller than 0, the state transition unit 160 may change, from the on state to the off state, the sub module having the minimum sub module voltage SMon-state (min) in the on-state SM group among the sub module having the minimum sub module voltage SMon-state (min) and the sub module having SMon-state (max) the maximum sub module voltage in the on-state SM group and the sub module SMoff-state (min) having the minimum sub module voltage and the sub module having the maximum sub module voltage SMoff-state (max) in the off-state SM group. Thus, although a switch in the sub module SMon-state (max) having the maximum sub module voltage in the on-state SM group is, in principle, turned on, a corresponding switch may be turned off because a corresponding sub module has been changed to the off state.

As shown in FIG. 9f, in the case where the difference value Diff (t) is 9 and the arm current iarm (t) is smaller than 0, the state transition unit 160 may change, from the on stated to the off state, the sub module having the minimum sub module voltage SMon-state (min) in the on-state SM group and change, from the off state to the on state, the sub module having the maximum sub module voltage SMoff-state (max) in the off-state SM group.

The numbers n, m and s may be natural numbers.

As described above, since the weight information Vvirtual (t) is applied to the sub module voltages Vsm(t) and Vsm (t-$\Delta$t) of each of the sub modules SM_1 to SM_n to uniformly maintain the switching frequencies between the sub modules SM_1 to SM_n in the arm module 20, embodiments may enhance the reliability of a goods through the extension of the life of each of the sub modules SM_1 to SM_n themselves and of the life of the switch of each of the sub modules SM_1 to SM_n.

Thus, the detailed description should not be construed as limitative in all aspects and should be considered exemplary. The scope of the present disclosure should be defined by the reasonable understanding of the following claims and all changes falling within the equivalent scope of the present disclosure are included in the scope of the present disclosure.

What is claimed is:

1. A method of controlling voltage balancing of a modular multi-level converter, the method comprising:
   receiving state information related to each sub module in an arm module;
   grouping the sub modules into sub module groups;
   calculating weight information related to each of the sub modules based on the corresponding received state information;
   determining first state information of the received state information that is related to each sub module of a first of the sub module groups;
   determining second state information of state information previously stored in a memory that is related to each sub module not included in the first of the sub module groups;
   controlling switching of a sub module by using the first state information, the second state information and the calculated weight information; and
   updating, the memory with the determined first state information.

2. The method according to claim 1, wherein each of the first state information and the second state information comprises on/off state information and a sub module voltage.

3. The method according to claim 2, wherein controlling the switching comprises:
   applying the calculated weight information to the sub module voltage in the first state information; and
   applying the calculated weight information to the sub module voltage in the second state information.

4. The method according to claim 2, wherein:
   the weight information comprises voltage levels that include a positive voltage value, a negative voltage value and 0 volts; and
   the voltage levels are added to and subtracted from the sub module voltage in the first state information and are added to and subtracted from the sub module voltage in the second state information.

5. The method according to claim 3, further comprising applying the weight information to the sub modules, wherein controlling the switching further comprises:
   grouping the sub modules into an on state sub module group and an off state sub module group;
   determining a sub module having a minimum sub module voltage and a sub module having a maximum sub module voltage among sub modules in the on state sub module group; and
   determining a sub module having a minimum sub module voltage and a sub module having a maximum sub module voltage among sub modules in the off state sub module group.

6. The method according to claim 5, wherein grouping the sub modules to which the weight information is applied comprises determining whether each of the sub modules has an on state or an off state based on the on/off state information.

7. The method according to claim 1, wherein the state information is received for a plurality of cycles.

8. The method according to claim 7, wherein state information related to each of the sub modules in each of the plurality of sub module groups is received once during the plurality of cycles.

9. The method according to claim 1, further comprising utilizing difference value information and an arm current of the arm module to change at least a state of a sub module having a minimum sub module voltage and a sub module having a maximum sub module voltage among sub modules in an on state sub module group or a state of a sub module having a minimum sub module voltage and a sub module having a maximum sub module voltage among sub modules in an off state sub module group.

10. The method according to claim 9, wherein the difference value information is a difference between a reference voltage transmitted from a control unit and an arm voltage of the arm module.

11. A modular multi-level converter comprising:
   a memory configured to store state information on each sub module in an arm module;
   an input unit configured to receive the state information from the arm module in order to group the sub modules into sub module groups;
   a weight calculation unit configured to calculate weight information related to each of the sub modules based on the corresponding received state information; and
   a determination unit configured to:
   determine first state information of the received state information that is related to each sub module of a first of the sub module groups;
   determine second state information of state information previously stored in the memory that is related to each sub module not included in the first of the sub module groups, and
   control switching of a sub module by using the first state information, the second state information and the calculated weight information.

12. The modular multi-level converter according to claim 11, wherein each of the first state information and the second state information comprises on/off state information and a sub module voltage.

13. The modular multi-level converter according to claim 12, wherein:
   the weight information comprises voltage levels that include a positive voltage value, a negative voltage value and 0 volts; and
   the determination unit is further configured to add the voltage levels to and subtract the voltage levels from the sub module voltage in the first state information and to add the voltage levels to and subtracts the voltage levels from the sub module voltage in the second state information.

14. The modular multi-level converter according to claim 13, wherein the determination unit is further configured to apply the weight information to the sub modules and to control the switching of the sub module by:
   grouping the sub modules into an on state sub module group and an off state sub module group;
   determining a sub module having a minimum sub module voltage and a sub module having a maximum sub module voltage among sub modules in the on state sub module group; and
   determining a sub module having a minimum sub module voltage and a sub module having a maximum sub module voltage among sub modules in the off state sub module group.

15. The modular multi-level converter according to claim 14, wherein the determination unit is further configured to group the sub modules by determining whether each of the n sub modules has an on state or an off state based on the on/off state information.

16. The modular multi-level converter according to claim 11, wherein the state information is received for a plurality of cycles.

17. The modular multi-level converter according to claim 16, wherein state information related to each of the sub modules in each of the plurality of sub module groups is received once during the m cycles.

18. The modular multi-level converter according to claim 11, wherein the determination unit is further configured to utilize difference value information and an arm current of the arm module to change at least a state of a sub module having a minimum sub module voltage and a sub module having a maximum sub module voltage among sub modules in an on state sub module group or a state of a sub module having a minimum sub module voltage and a sub module having a maximum sub module voltage among sub modules in an off state sub module group.

19. The modular multi-level converter according to claim 18, wherein the difference value information is a difference between a reference voltage transmitted from a control unit and an arm voltage of the arm module.

20. The method according to claim 12, wherein the determination unit is further configured to control the switching of the sub module by:
   applying the calculated weight information to the sub module voltage in the first state information; and
   applying the calculated weight information to the sub module voltage in the second state information.

* * * * *